(12) United States Patent
Bustin et al.

(10) Patent No.: US 12,172,659 B2
(45) Date of Patent: Dec. 24, 2024

(54) ALLOCATION OF NON-MONITORING PERIODS DURING AUTOMATED CONTROL OF A DEVICE

(71) Applicant: GM GLOBAL TECHNOLOGY OPERATIONS LLC, Detroit, MI (US)

(72) Inventors: Ronit Bustin, Kfar Saba (IL); Gila Kamhi, Zichron Yaakov (IL); Asaf Degani, Palo Alto, CA (US); Claudia Goldman-Shenhar, Mevasseret Zion (IL); Zahy Bnaya, Tel Aviv (IL); Ariel Telpaz, Tel Aviv (IL); Yael Shmueli Friedland, Tel Aviv (IL); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 17/384,037

(22) Filed: Jul. 23, 2021

(65) Prior Publication Data
US 2023/0036945 A1 Feb. 2, 2023

(51) Int. Cl.
*B60W 50/08* (2020.01)
*B60W 50/04* (2006.01)
*B60W 50/14* (2020.01)
*B60W 50/00* (2006.01)

(52) U.S. Cl.
CPC .......... *B60W 50/085* (2013.01); *B60W 50/04* (2013.01); *B60W 50/14* (2013.01); *B60W 2050/0002* (2013.01); *B60W 2050/007* (2013.01); *B60W 2050/0096* (2013.01)

(58) Field of Classification Search
CPC .... B60W 50/085; B60W 50/04; B60W 50/14; B60W 2050/0002; B60W 2050/007; B60W 2050/0096; B60W 60/0051; B60W 60/0053; B60W 50/082
See application file for complete search history.

(56) References Cited

U.S. PATENT DOCUMENTS

| | | | | |
|---|---|---|---|---|
| 10,935,974 | B1* | 3/2021 | Fields | B60W 60/0053 |
| 11,485,367 | B2* | 11/2022 | Yoshida | B60W 60/0057 |
| 2017/0368936 | A1* | 12/2017 | Kojima | B60W 50/082 |
| 2020/0283028 | A1* | 9/2020 | Oba | B60W 50/14 |
| 2020/0331458 | A1* | 10/2020 | Nakamura | B60W 40/08 |
| 2021/0155268 | A1* | 5/2021 | Oba | G06F 1/163 |
| 2021/0188301 | A1* | 6/2021 | Oba | B60W 50/14 |

(Continued)

*Primary Examiner* — Sze-Hon Kong
(74) *Attorney, Agent, or Firm* — CANTOR COLBURN LLP

(57) ABSTRACT

A system for control of an automated device includes a control system configured to operate a device during an operating mode corresponding to a first state in which the control system automatically controls operation, the operating mode prescribing that a user monitor the device operation during automated control, and a scheduling module configured to, during the operating mode, receive a request for the user to temporarily stop monitoring in order to perform a task unrelated to the device operation, allocate a time period during which automated control is maintained and the user stops monitoring, the time period including a non-monitoring period having a duration based on a minimum amount of time for the task, and put the device into a temporary state at initiation of the allocated time period during which the user stops monitoring and automated control is maintained.

20 Claims, 10 Drawing Sheets

(56) References Cited

U.S. PATENT DOCUMENTS

| | | | | |
|---|---|---|---|---|
| 2022/0144301 A1* | 5/2022 | Yamamoto | | G01C 21/3697 |
| 2022/0161813 A1* | 5/2022 | Oba | | B60W 60/0053 |
| 2022/0234625 A1* | 7/2022 | Anabuki | | B60W 60/0053 |
| 2022/0274621 A1* | 9/2022 | Ota | | B60W 50/14 |
| 2022/0340156 A1* | 10/2022 | Yamamoto | | G08G 1/16 |
| 2023/0375354 A1* | 11/2023 | Loum | | G01C 21/3664 |

* cited by examiner

ALLOCATION OF NON-MONITORING PERIODS DURING AUTOMATED CONTROL OF A DEVICE

INTRODUCTION

The subject disclosure relates to the art of automated driving or automated device operation. More particularly, the subject disclosure relates to a system and method for allocating non-monitoring periods during automated device or vehicle operation, such as during automated driving (e.g., Level 2-3) and highly automated driving (Level 4).

Vehicles are increasingly equipped with automated driving systems that provide various levels of automation. Vehicles can, under certain conditions, feature full automated control, semi-automated control, and automated control of specific vehicle functions (e.g., braking or steering). Automation in vehicles can be categorized according to automation levels. For example, Level 0 automation refers to full manual operation (no driving automation), and Level 1 automation includes driver assistance. Level 2 automation allows for vehicle control of steering and acceleration, with the driver monitoring and ready to take control at any time. In Level 3 automation (conditional automation), a vehicle can monitor the environment and automatically control the operation. The driver in Level 3 need not monitor the environment, but must be ready to take control with notice.

Level 2 automation systems generally require that a driver is attentive (eyes on the road) and ready to take manual control at any moment when the vehicle is performing automated operations. Commonly, a short period of time (e.g., 3-5 seconds depending on speed and other factors) is allowed for the driver's eyes to be off the road. Such a limited time period precludes the driver from being able to perform many non-driving related tasks, and does not make any allowance for driving context. Thus, it would be desirable to have a system that provides flexibility for a user to perform various non-driving related tasks.

SUMMARY

In one exemplary embodiment, a system for control of an automated device includes a control system configured to operate a device during an operating mode, the operating mode corresponding to a first state in which the control system automatically controls device operation, the operating mode prescribing that a user monitor the device operation during automated control, and a scheduling module configured to, during the operating mode, receive a request for the user to temporarily stop monitoring in order to perform a task unrelated to the device operation. The scheduling module is also configured to, during the operating mode, allocate a time period during which automated control is maintained and the user stops monitoring, the time period including a non-monitoring period having a duration based on a minimum amount of time for the task, and put the device into a temporary state at initiation of the allocated time period during which the user stops monitoring and automated control is maintained.

In addition to one or more of the features described herein, the scheduling module is configured to return the device to the first state based on at least one of: user input and a condition of an environment around the device.

In addition to one or more of the features described herein, the device is a vehicle and the task is a non-driving related task (NDRT).

In addition to one or more of the features described herein, the request is generated based on at least one of: a user request during device operation, a user condition, a previously scheduled time period and a system suggestion based on a user history.

In addition to one or more of the features described herein, the allocated time period includes a time period for performing the task, and a transition period associated with transition from the temporary state to the first state.

In addition to one or more of the features described herein, the non-monitoring period includes at least a first non-monitoring period and a second non-monitoring period, and includes a monitoring period between the first period and the second period.

In addition to one or more of the features described herein, the scheduling module is configured to provide a plurality of allocated time periods, each allocated time period associated with a different task or task type.

In addition to one or more of the features described herein, the scheduling module is configured to provide the plurality of allocated time periods in an order based on an importance or urgency of each allocated time period.

In addition to one or more of the features described herein, the scheduling module is configured to extend the non-monitoring period based on a user request.

In one exemplary embodiment, a method of controlling an automated device includes operating the device during an operating mode, the operating mode corresponding to a first state in which a control system automatically controls device operation, the operating mode prescribing that a user monitor the device operation during automated control, and during the operating mode, receiving a request for the user to temporarily stop monitoring in order to perform a task unrelated to the device operation, allocating a time period during which automated control is maintained and the user stops monitoring, the time period including a non-monitoring period having a duration based on a minimum amount of time for the task, and putting the device into a temporary state at initiation of the allocated time period during which the user stops monitoring and automated control is maintained.

In addition to one or more of the features described herein, the method further includes returning the device to the first state based on at least one of: user input and a condition of an environment around the device.

In addition to one or more of the features described herein, the device is a vehicle and the task is a non-driving related task (NDRT).

In addition to one or more of the features described herein, the allocated time period includes a time period for performing the task, and a transition period associated with transition from the temporary state to the first state.

In addition to one or more of the features described herein, the non-monitoring period includes at least a first non-monitoring period and a second non-monitoring period, and includes a monitoring period between the first period and the second period.

In addition to one or more of the features described herein, the allocating includes providing a plurality of allocated time periods, each allocated time period associated with a different task or task type.

In addition to one or more of the features described herein, the scheduling module is configured to extend the non-monitoring period based on a user request.

In one exemplary embodiment, a vehicle system includes a memory having computer readable instructions, and a processing device for executing the computer readable instructions, the computer readable instructions controlling the processing device to perform operating the vehicle during an operating mode, the operating mode corresponding to a first state in which a control system automatically controls vehicle operation, the operating mode prescribing that a user monitor the vehicle operation during automated control, during the operating mode, receiving a request for the user to temporarily stop monitoring in order to perform a non-driving related task (NDRT), allocating a time period during which automated control is maintained and the user stops monitoring, the time period including a non-monitoring period having a duration based on a minimum amount of time for the NDRT, and putting the vehicle into a temporary state at initiation of the allocated time period during which the user stops monitoring and automated control is maintained.

In addition to one or more of the features described herein, the allocated time period includes a time period for performing the task, and a transition period associated with transition from the temporary state to the first state.

In addition to one or more of the features described herein, the non-monitoring period includes at least a first non-monitoring period and a second non-monitoring period, and includes a monitoring period between the first period and the second period.

In addition to one or more of the features described herein, the allocating includes providing a plurality of allocated time periods, each allocated time period associated with a different task or task type.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
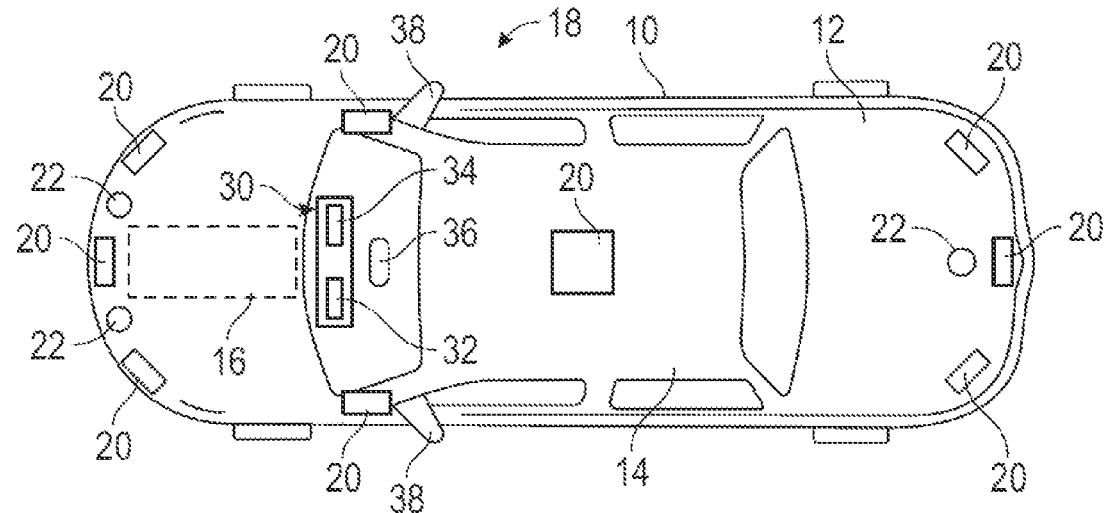
FIG. 1 is a top view of a motor vehicle including aspects of a scheduling and allocation system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems are provided for scheduling and allocating non-monitoring periods for automated vehicles, systems or devices. Some vehicles can have autonomous capability (Level 5) and may be able to degrade themselves to lower levels of automation (Level 4, Level 3, Level 2 and/or Level 1) depending on environmental conditions, sensor capabilities and a drivers' condition and intent. In an embodiment, the systems and methods perform scheduling and allocation for a vehicle when the vehicle is at a level of automation that allows automated control of the vehicle while a user or driver is actively monitoring the vehicle. An example of such a level of automation is Level 2 automation as defined by the Society of Automotive Engineers (SAE).

A scheduling and allocation system is configured to schedule and allocate non-monitoring time periods that allow a user to temporarily divert attention from automated device operation, and stop active monitoring in order to perform a task unrelated to the automated operation. The non-monitoring time period may be a pre-selected time period that can be extended if conditions permit. A short monitoring period may be provided between non-monitoring periods (periscoping). The automated device may be a vehicle or any other suitable device or system, such as an aircraft, a power plant supervised by humans, a production or manufacturing system or equipment, equipment used in a medical procedure, and others. In the context of vehicles, unrelated tasks are referred to as non-driving related tasks (NDRTs). In the following, unrelated tasks are described as NDRTs; however, it is to be understood that embodiments described herein are applicable any type of unrelated task performed during operation of any suitable automated device (e.g., Level 2 and/or 3 vehicle).

The system, in response to a request (e.g., from the user or generated by a vehicle processing unit) for a non-monitoring time period (an "NDRT request"), allocates a time period that includes a non-monitoring time period and may also include allotments (allocations) for transitioning between vehicle states and reacting to environmental conditions or events. The non-monitoring time period is based on an estimated amount of time to perform an NDRT (e.g., reading an e-mail, answering a call, etc.).

The system can allocate time periods under a "fixed" scheme in which a defined amount of time is provided for an NDRT, or under a "rolling" scheme in which an allocated time period can be further extended based on current conditions. An allocated time period may include a relatively short monitoring period between non-monitoring periods or within a given non-monitoring period. Inclusion of such a short monitoring period is referred to as "periscoping." A "short" monitoring period, in an embodiment, is a duration that is sufficient to allow a user to direct attention to the road and observe objects in the road (e.g., 3 seconds).

In an embodiment, the system is configured to coordinate the scheduling of multiple allocated time periods for a plurality of discrete NDRTs. For example, the system includes a dynamic priority queue or other mechanism to schedule NDRTs based on factors such as urgency, importance and physiological (comfort) needs.

In an embodiment, the system determines the amount of time to be allocated based on user readiness and environmental context. An "environmental context" includes any combination of environmental conditions and features that can affect driving or operating behavior. An environmental context may include features of the environment around a vehicle or other automated system, which may include the physical surrounding and features and conditions thereof (e.g., other vehicles, pedestrians, road type, intersections, traffic control devices, road conditions, time of day, weather, etc.), and vehicle dynamics (e.g., stationary, at a given speed, braking, accelerating, turning, etc.). User readiness refers to a condition of the user (e.g., distracted, stressed, eyes away from the road, transitioning to manual control, etc.) indicative of whether a user is ready to perform a task related to controlling the vehicle's automated system.

Allocation of a time period may occur in response to a user request, or pre-selected requests scheduled before or during driving or operation. Allocation may occur automatically in response to selected criteria (e.g., based on a suggestion presented to the user and the user accepting the suggestion). For example, a user can be monitored or tracked to determine the level of readiness to take control of the vehicle or assume monitoring, and/or to identify conditions indicative of a desire to perform an NDRT (e.g., user appears tired or hungry, user looks to a mobile device or messages from a vehicle infotainment system). For example, the allocation process may be activated based on eye gaze tracking by a vehicle's driver monitoring system (DMS) or other suitable tracking system.

Although the following description is in the context of a vehicle, embodiments described herein are not so limited and can be realized in conjunction with any of various devices and systems having automated behaviors (automated systems), or any system or process that involves human monitoring (where the human can intervene). Examples of such devices or systems include aircraft, factory or manufacturing machinery, robotics, construction vehicles, smart home devices, internet-of-things devices, and others.

Embodiments described herein present a number of advantages. For example, current automated vehicles have a Level 2 or Level 3 automation, which require a mechanism for transfer of control back to manual if a driver is inattentive (stops monitoring) for more than a few seconds. For example, many automated vehicles are subject to the informal, rule of thumb, duration used by the automated vehicle industry that allows for "3 second" eyes-off-road when, for example, the driver operates a radio or other infotainment device.

However, the amount of eyes-off time that can be allocated without adverse effects may vary based on many factors, such as driver state, vehicle state, road and other road user state, and environmental state. For example, there are driving situations that necessitate eyes-off periods of no more than 1 second or even none (such as during a merge or exit maneuver), but there are also situations (e.g., straight highway, few other road users, fair weather, etc.) where there is a possibility to extend automated control capabilities facilitating automated behavior, and thereby extend the eyes-off-road duration to longer than 3 seconds. Embodiments described herein improve current automated vehicle capabilities by providing for the allocation of time periods that can be tailored to specific users and situations to address a user's non-driving needs while maintaining safety.

FIG. 1 shows an embodiment of a motor vehicle 10, which includes a vehicle body 12 defining, at least in part, an occupant compartment 14. The vehicle body 12 also supports various vehicle subsystems including a powertrain system 16 (e.g., combustion, electrical, and other), and other subsystems to support functions of the engine system 16 and other vehicle components, such as a braking subsystem, a steering subsystem, and others.

The vehicle also includes a monitoring, detection and automated control system 18, aspects of which may be incorporated in or connected to the vehicle 10. The control system 18 in this embodiment includes one or more optical cameras 20 configured to take images, which may be still images and/or video images. Additional devices or sensors may be included in the control system 18, such as one or more radar assemblies 22 included in the vehicle 10. The control system 18 is not so limited and may include other types of sensors, such as infrared.

The vehicle 10 and the control system 18 include or are connected to an on-board computer system 30 that includes one or more processing devices 32 and a user interface 34. The user interface 34 may include a touchscreen, a speech recognition system and/or various buttons for allowing a user to interact with features of the vehicle. The user interface 24 may be configured to interact with the user via visual communications (e.g., text and/or graphical displays), tactile communications or alerts (e.g., vibration), and/or audible communications. The on-board computer system 30 may also include or communicate with devices for monitoring the user, such as interior cameras and image analysis components. Such devices may be incorporated into a driver monitoring system (DMS).

In addition to the user interface 34, the vehicle 10 may include other types of displays and/or other devices that can interact with and/or impart information to a user. For example, in addition to, or alternatively, the vehicle 10 may include a display screen (e.g., a full display mirror or FDM) incorporated into a rearview mirror 36 and/or one or more side mirrors 38. In one embodiment, the vehicle 10 includes one or more head up displays (HUDs). Other devices that may be incorporated include indicator lights, haptic devices, interior lights, auditory communication devices, and others.

Haptic devices (tactile interfaces) include, for example, vibrating devices in the vehicle steering wheel and/or seat. The various displays, haptic devices, lights, and auditory devices are configured to be used in various combinations to present explanations to a user (e.g., a driver, operator or passenger).

The vehicle 10, in an embodiment, includes a scheduling and allocation system, which may be incorporated into the on-board computer system 30 or in communication with the computer system 30. In addition, or alternatively, the scheduling and allocation system can be incorporated into a remote processing device such as a server, a personal computer, a mobile device, or any other suitable processor.

Figure 2:
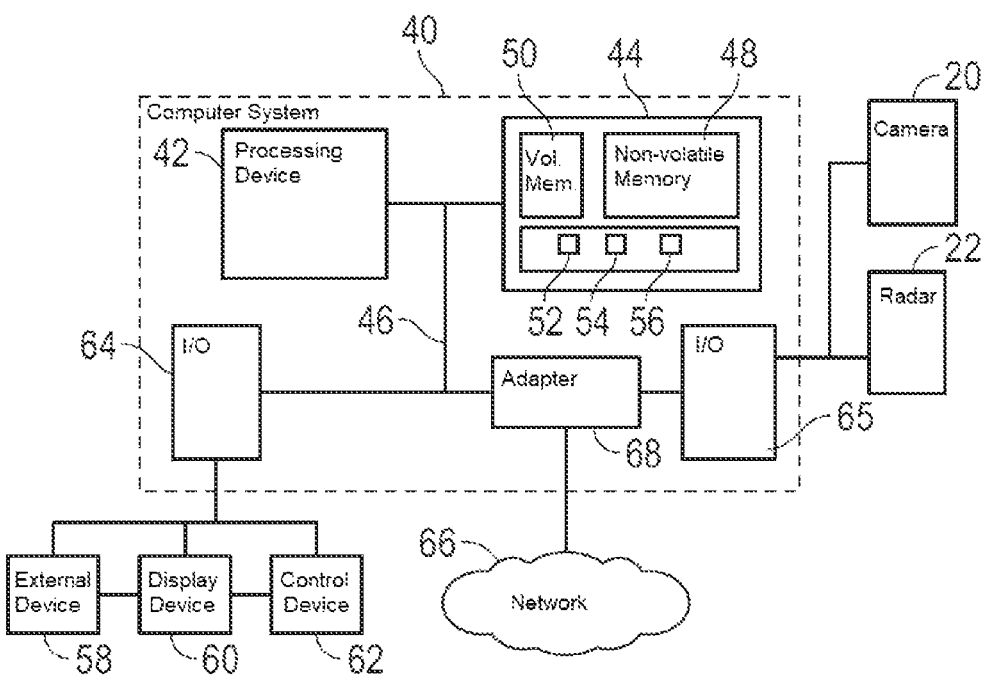
FIG. 2 depicts a computer system in accordance with an exemplary embodiment.

FIG. 2 illustrates aspects of an embodiment of a computer system 40 that is in communication with, or is part of, the control system 18 and/or the explanation system, and that can perform various aspects of embodiments described herein. The computer system 40 includes at least one processing device 42, which generally includes one or more processors for performing aspects of image acquisition and analysis methods described herein. The processing device 42 can be integrated into the vehicle 10, for example, as the on-board processing device 32, or can be a processing device separate from the vehicle 10, such as a server, a personal computer or a mobile device (e.g., a smartphone or tablet).

Components of the computer system 40 include the processing device 42 (such as one or more processors or processing units), a system memory 44, and a bus 46 that couples various system components including the system memory 44 to the processing device 42. The system memory 44 may include a variety of computer system readable media. Such media can be any available media that is accessible by the processing device 42, and includes both volatile and non-volatile media, and removable and non-removable media.

For example, the system memory 44 includes a non-volatile memory 48 such as a hard drive, and may also include a volatile memory 50, such as random access memory (RAM) and/or cache memory. The computer system 40 can further include other removable/non-removable, volatile/non-volatile computer system storage media.

The system memory 44 can include at least one program product having a set (e.g., at least one) of program modules that are configured to carry out functions of the embodiments described herein. For example, the system memory 44 stores various program modules that generally carry out the functions and/or methodologies of embodiments described herein. A module or modules 52 may be included to perform functions related to determination of user state, vehicle state and environmental conditions. A scheduling and allocation module 54 may be included for receiving data (e.g., state information and NDRT requests). An interface module 56 may be included for interacting with a user to facilitate various methods described herein. The system 40 is not so limited, as other modules may be included. The system memory 44 may also store various data structures, such as data files or other structures that store data related to imaging and image processing. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 42 can also communicate with one or more external devices 58 such as a keyboard, a pointing device, and/or any devices (e.g., network card, modem, etc.) that enable the processing device 42 to communicate with one or more other computing devices. In addition, the processing device 42 may communicate with one or more devices such as the cameras 20 and the radar assemblies 22. The processing device 42 may communicate with one or more display devices 60 (e.g., an onboard touchscreen, cluster, center stack, HUD, mirror displays (FDM) and others), and vehicle control devices or systems 62 (e.g., for partially automated (e.g., driver assist) and/or fully automated vehicle control). Communication with various devices can occur via Input/Output (I/O) interfaces 64 and 65.

The processing device 42 may also communicate with one or more networks 66 such as a local area network (LAN), a general wide area network (WAN), and/or a public network (e.g., the Internet) via a network adapter 68. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

Figure 3:
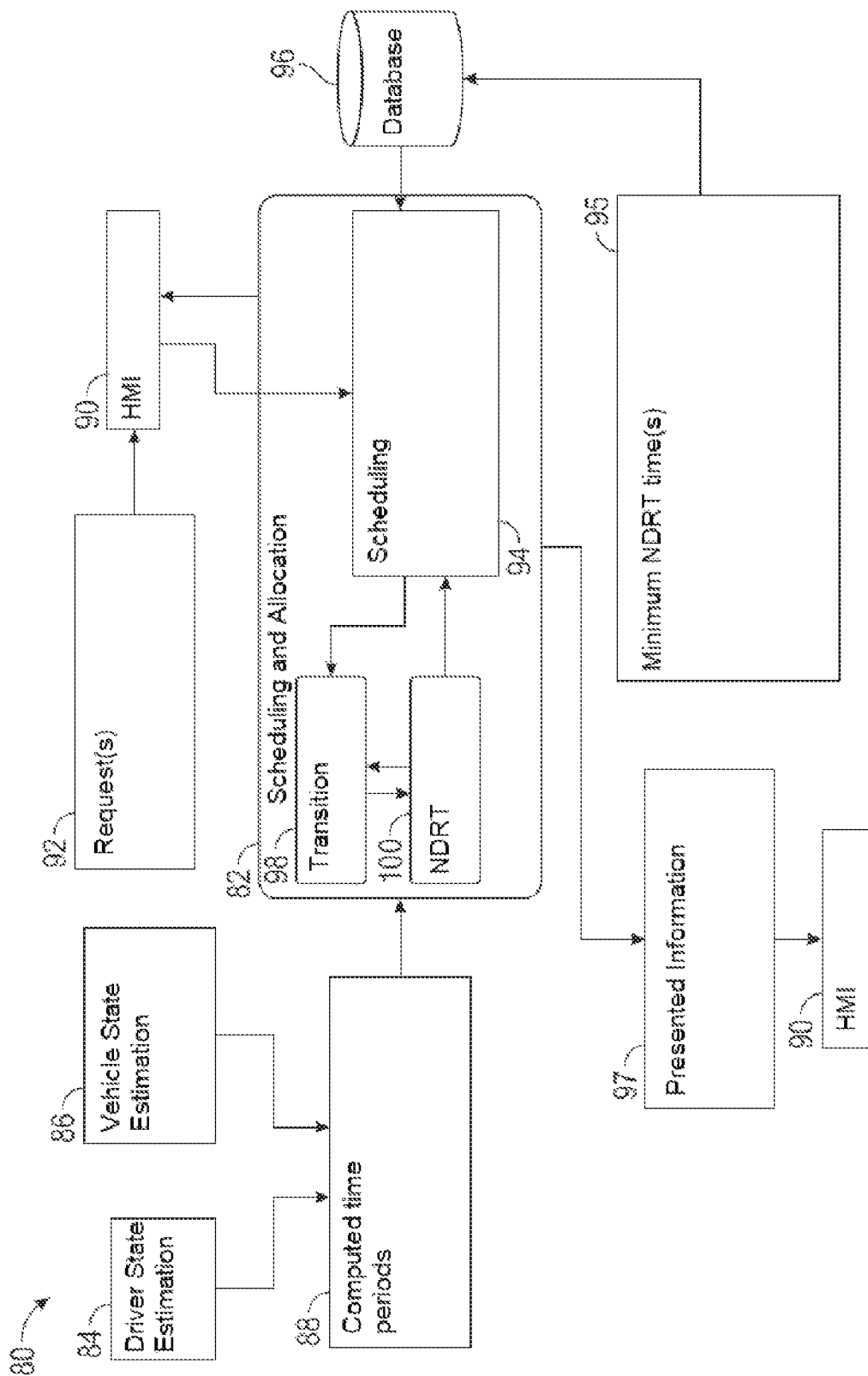
FIG. 3 is a schematic representation of an embodiment of a control system in accordance with an exemplary embodiment, the control system configured to perform aspects of vehicle operation and allocate time periods for non-driving related task (or tasks unrelated to automated device operation), each allocated time period including one or more non-monitoring periods.

FIG. 3 depicts an embodiment of a system 80 for allocating time periods for non-driving related tasks (NDRTs). An NDRT is any task or behavior that causes a user to be inattentive to vehicle operation. Examples of such tasks include reading (e.g., an email or text message), eating, drinking, communicating via phone or video, retrieving items, or any other task where the user's focus is on something other than driving or operating a vehicle (or other automated device). Although the embodiments are discussed in conjunction with a vehicle, they can be applied to any device or system that includes some combination of manual control and automated operation. Examples of such devices include manufacturing machinery, robots, construction equipment and others. As such, an NDRT is to be understood as a task that takes away user focus from any device and is not limited to the context of driving an automated vehicles.

The system 80 includes a scheduling and allocation module 82 that receives time estimates (e.g., $t_{est\ non\ monitoring}$, $t_{evasive\ maneuver}$, and $t_{monitoring->driving}$ as defined below) based on driver state information, and vehicle and environmental state information, and estimates and allocates time periods that accommodate user NDRTs. The system 80 includes various components or modules that interact with the scheduling and allocation module 82 and/or provide NDRT requests. For example, a driver state estimation module 84 determines a driver state (e.g., attentive, distracted, eyes on road, eyes off road, etc.), and an environment and vehicle state estimation module 86 determines the state of the vehicle (e.g., operating mode, dynamics) and a state or condition of an environment around the vehicle. The driver state may be estimated to determine an estimation of the time required for a driver to transition from monitoring to manual driving (to ensure that the driver has sufficient time to return to monitoring and driving if needed), and the time required for the system to suggest time periods for NDRTs.

The environment and vehicle state estimation module 86 can be used to determine whether environmental and vehicle conditions exist such that a time period for NDRT can be allocated. Examples of environmental conditions include road type (e.g., highway, local), proximity to other vehicles, objects in the environment, whether there is an event that the vehicle is approaching that would preclude or limit availability for NDRT, or any combination of environmental features that would affect the availability of times for a user to be inattentive.

The driver state estimation module 84 may be used to detect whether the driver performs an action that is indicative of a non-driving task or behavior (e.g., looking down at a mobile device, or reading a newspaper on the front passenger seat). In an embodiment, the driver state estimation module 84 determines based on a user condition (e.g., eyes off road, driver picks up or looks at mobile device, driver appears agitated or hungry, etc.), whether an NDRT would be appropriate to benefit the driver. An NDRT may be considered a benefit if the NDRT is consistent with user preferences (e.g., from user inputs or inferred from tracking user behavior and condition), or consistent with similar users' preferences, given the time allowed for the NDRT. For example, if a user has been monitoring for a given amount of time, the driver state estimation module 84 can determine that the user would benefit from a change in position, determine transition times (amounts of time to transition between states), and automatically generate a request or provide a suggestion to the user of an NDRT.

The modules 84 and 86 can be used to compute various time periods (e.g., $t_{est\ non\ monitoring}$, $t_{evasive\ maneuver}$, and $t_{monitoring->driving}$) that are used to calculate individual allocated time periods ($t_{NDRT\_alloc.}$) for performing NDRTs. Such individual time periods take into account the time needed for transitioning between operating states and performing evasive maneuvers. For example, the module 84 and/or 86 can be used to determine the amount of time the driver can be in a non-monitoring capacity ($t_{est\ non\ monitoring}$), which is determined given the state of the vehicle, the environment and/or the state of the driver. In another example, the module 84 and/or 86 can be used to determine an amount of time for the user and the vehicle to transition from a "monitoring state" in which the driver is attentive to the road and vehicle system state, but is not physically controlling the vehicle, to a "manual state" or "driving state" in which the driver has active manual control. This time period is denoted as $t_{monitoring->driving}$. During an allocated time period, the vehicle is in an "NDRT state" in which the driver does not need to monitor the vehicle (i.e., user monitoring is suspended).

Furthermore, the module 84 and/or 86 can be used to compute a time period for performing a critical evasive maneuver ($t_{evasive\ maneuver}$). Examples of evasive maneuvers include evasive actions such as steering, changing lanes, emergency braking and others. $t_{evasive\ maneuver}$ may vary based on environmental and vehicle conditions, as well as driver readiness for the evasive maneuver. For example, this time period is shorter in higher speed regions (e.g., highways) or congested regions, and is longer in lower speed regions or non-congested regions.

The system 80 also includes a human-machine interface (HMI) 90, such as a touchscreen or display that allows a user or other entity to input requests to the allocation module 82. The HMI 90 may also present information (block 97) to a user, such as an indication that an allocated time period is started, the allocated duration, route information, etc.

Allocation of a time period for an NDRT is prompted by a request (an NDRT request), which can be generated by, or provided from, various locations and devices or modules. As discussed further below, a request or requests (represented by block 92) may be generated by a user while the vehicle is driving ("during ride request") and/or prior to driving ("pre-ride request"), such as for an anticipated videoconference or phone call. Such requests may be entered by a user via the HMI 90 (e.g., a touchscreen, mobile device, vehicle infotainment system displays or buttons). Requests may also be generated automatically based on monitoring a user's condition via, for example, the driver state estimation module 84.

In an embodiment, an NDRT request is generated based on a user's history (e.g., by machine learning). The system 80 learns a specific pattern of the user (e.g., the user always calls his wife when he is driving back home). An NDRT request may also be generated based on identifying notifications, such as an incoming urgent email, or SMS message.

The time periods $t_{monitoring->driving}$ and $t_{evasive\ maneuver}$ are calculated (e.g., continuously or on a periodic basis) and input to the allocation and scheduling module 82, along with an estimated amount of time in which the user would not be required to monitor vehicle operation ($t_{est\ non\ monitoring}$), which may be acquired from various sources, such as regulatory sources, analyses of previously collected data and/or simulations, and/or based on conditions such as road conditions, traffic density, speed and user state.

Inputs to the allocation and scheduling module 82 may also include information regarding estimated times for performing NDRTs ($t_{estimated\_NDRT}$), estimated times for returning from the NDRT state to the monitoring state after a non-monitoring period ($t_{transition->monitoring}$), and a minimum time for a given NDRT ($t_{min\ NDRT}$). The minimum NDRT time can be determined from experimental data or previously collected vehicle data, and is provided to avoid making suggestions or allowing NDRTs when the system 80 cannot allocate sufficient time. If the system 80 cannot accommodate at least the minimum time, a suggestion is not presented (and the allocation and scheduling module 82 can move to another NDRT, e.g., in a list or queue).

The scheduling and allocation module 82 includes various modules for initiating NDRT states, returning to monitoring or driving states, and/or coordinating multiple NDRT states. For example, a scheduling module 94 receives inputs from the HMI 90 and/or the modules 84 and 86, and/or from a ML unit that estimates NDRT times based on history and learned behaviors. For a given NDRT request, the scheduling module 94 receives $t_{estimated\_NDRT}$ and $t_{transition->monitoring}$ (and in some cases, a minimum NDRT time $t_{min\ NDRT}$). These time periods may be pre-determined periods stored remotely and/or locally at a selected location. For example, a look-up table or other data structure in a database 96 stores time budgets and information such as estimated NDRT times, estimated transition times and/or minimum NDRT times (block 95) in the database 96.

Upon initiation of an allocated time period and initiation of an NDRT state, a transition module 98 transitions the vehicle from the monitoring state to the NDRT state. An NDRT module 100 controls transitions between the monitoring state, the NDRT state and the manual state. The NDRT module 100 may transition back to the monitoring state at the expiration of the allocated time period ($t_{NDRT\ total}$). The NDRT module 100 can transition sooner, for example, if the user so requests or a condition arises that would necessitate a transition to manual driving (e.g., an accident, pedestrian or other object in road, etc.). One or more of the above modules may be configured as or include one or more finite state machines (FSMs).

The scheduling module 94 may be configured to perform and/or coordinate the execution of multiple NDRT states associated with multiple NDRTs. For example, the scheduling module 94 can access time for various types of tasks, and use such times to allocate time periods for execution of multiple tasks. In some cases, the module 82 can assign a short monitoring period between NDRTs. As discussed further below, time periods can be allocated based on urgency or importance.

Figure 4:
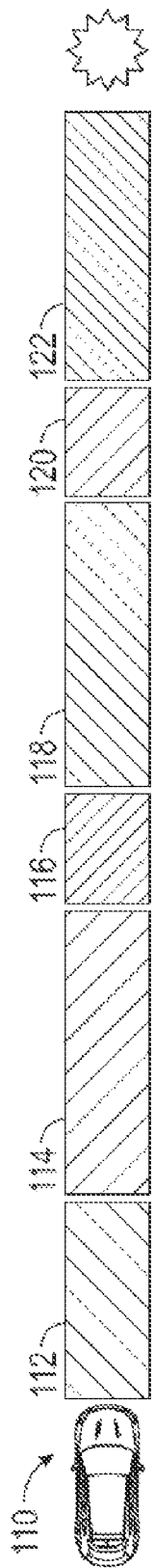
FIG. 4 depicts an embodiment of a time period allocated for non-monitoring during automated operation of a vehicle, in accordance with an exemplary embodiment.

FIG. 4 depicts various vehicle states during a time period 110. The time period 110 includes an allocated time period 112 that corresponds to an amount of time allocated to the user to perform the NDRT ($t_{NDRT\_alloc.}$), which may be fixed or extended as conditions permit. This time period may be presented to the user, e.g., via the HMI 90. Another time period 114 corresponds to $t_{transition->monitoring}$, i.e., the estimated time to return to monitoring from an NDRT state (e.g., an emergency or urgent satiation arises, necessitating that the user be brought back to a driving loop), or $t_{NDRT\_alloc.}$ expires. A time period 116 corresponds to a time that the vehicle is in the monitoring state.

Time periods 114, 118 and 122 are estimated to determine whether there is sufficient time for the vehicle to transition to manual control (driving state) and react to a road event or environmental condition (e.g., pedestrian in the road, another vehicle intersects the vehicle or trajectory). The time periods 114, 118 and 122 represent the ability of a vehicle and user to return to manual operation to react to a road event.

Time period 118 is a time period that corresponds to the time to transition from the monitoring state to the (manual) driving state ($t_{monitoring->driving}$). This time period allows for returning to the driving loop (including stabilization) in an effective manner Time period 120 ($I_{driving}$) represents the vehicle being in the driving state. Time period 122 ($t_{evasive\ maneuver}$) is provided for the user to perform a successful critical maneuver (e.g., an emergency evasive maneuver).

Figure 5:
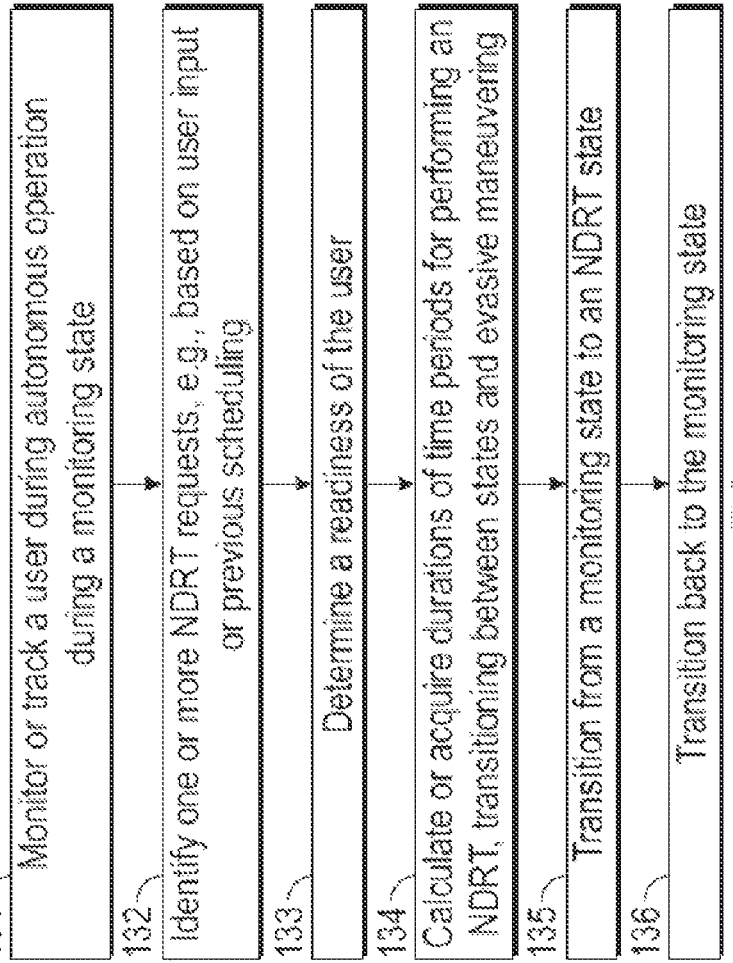
FIG. 5 is a flow diagram depicting aspects of a method of scheduling and allocating time periods including non-monitoring periods for automated vehicles and/or other automated devices, in accordance with an exemplary embodiment.

FIG. 5 depicts a method 130 of scheduling and allocating time periods during automated driving (or other automated operation) for a user to be inattentive to vehicle or device operation. The method 130 is discussed in conjunction with blocks 131-136. The method 130 is not limited to the number or order of steps therein, as some steps represented by blocks 131-136 may be performed in a different order than that described below, or fewer than all of the steps may be performed.

The method 130 is discussed in conjunction with the vehicle of FIG. 1 and a processing system, which may be, for example, the computer system 40, the on-board computer system 30 or a combination thereof. Aspects of the method 130 are discussed in conjunction with the control system 80 for illustration purposes. It is noted the method 130 is not so limited and may be performed by any suitable processing device or system, or combination of processing devices.

At block 131, a vehicle system (e.g., the control system 80) tracks or observes a user during automated operation of a vehicle. The vehicle is in a monitoring state in which the vehicle is controlled automatically and the driver is tracked to ensure that the driver is attentive ("eyes on road"). While in the monitoring state, the vehicle may allow for a default period of time for the user to be inattentive, which may be a short period (e.g., 3 seconds) or longer (e.g., minutes, tens of minutes or greater). This amount of time is a fixed amount that is unrelated to the user condition or desire to perform an NDRT.

At block 132, the system identifies an NDRT request. A request may be identified based on receiving an affirmative input from the user, based on pre-scheduled tasks, or based on the user condition. For example, a user may enter a request via the vehicle's infotainment system, the HMI 90 or other user interface.

One type of request is generated based on a suggestion presented to the user and accepted by the user, which may be identified by monitoring user behavior, vehicle state and/or environment to identify a potential NDRT. An NDRT suggestion (e.g., change position, make a phone call, etc.) may be generated and displayed to the user, and the user can confirm or reject the suggestion. For example, the user is monitored via a camera and/or other sensors to identify indications that the user would benefit from an NDRT (e.g., indications that the user is uncomfortable or agitated, or that the user has been in the driving or monitoring state for an extended period of time and could use a break).

Furthermore, a request may be generated by identification of external demands and activities (incoming of an important e-mail, SMS, phone). For example, the system can access the vehicle's infotainment system for important incoming e-mails, SMS from favorites list, SMS from work related list and others. The system may be configured to provide suggestions for potential NDRTs based on user history and learning.

Requests can also be identified based on previously entered or scheduled NDRTs, which may be entered into the vehicle system or a mobile application (app). For example, a calendar in a mobile device or in the infotainment system can be synchronized with system prior to vehicle operation, and the information becomes an input to the system.

In an embodiment, a machine learning module, FSM or other processing unit is configured to identify potential NDRTs and make suggestions based on machine learning (ML). Such a module reviews a user's history of engagement with a vehicle system (e.g., infotainment system) or mobile device, and makes suggestions based on the timing and recipients of previous calls (or other communications, such as texts and emails). For example, the module learns that a user typically makes a call to mom around 8:00 AM on most or all previous days, and thus automatically generates a suggestion to "call mom" at 8:00 AM. As discussed further herein, the module can also dynamically arrange a vehicle route so as to create a better opportunity for a scheduled NDRT. Thus, systems and methods herein can request NDRTs in an ad-hoc or opportunistic manner, and can request and schedule a planned NDRT (based on, e.g., a scheduled event, an ML learned NDRT, user preference, etc.) that can be pre-arranged by selecting the best routes, speeds, lanes, times, etc. to ensure safe and effective (i.e., with little chances for emergency takeovers) allotments or allocations of time for NDRTs.

In an embodiment, the system maintains a queue of tasks that have been pre-scheduled, may potentially be requested by the user during operation and/or tasks that can be suggested based on user condition. A dynamic queue may be maintained that lists various NDRTs (or types of NDRTs) and associates each NDRT with a level of importance or urgency, which can change dynamically. Each NDRT is associated in the queue with time periods related to a minimum time to perform the NDRT and times to transition to monitoring. NDRTs can be added to the queue, either at a scheduled time or based on current conditions.

At block 133, the system determines a level of readiness of the driver, and/or the driver's intentions and motivations. Readiness categories include physical availability, physiological preparedness, cognitive awareness and skill level (ability to perform various NDRTs or types of tasks). Readiness can be determined, for example, by monitoring a driver's posture, monitoring eye gaze, and facial analysis to determine emotional states, and/or querying the driver. Readiness categories can be stored and correlated with an amount of time for a driver to transition from the NDRT state to monitoring ($t_{transition->monitoring}$) A value of $t_{transition->monitoring}$ may be attached to every NDRT in the queue, as it can be a function of the user as well as the specific NDRT.

In addition to driver "readiness," the system may assess the driver's "intentions and motivation" to assume monitoring and/or take manual control. "Intentions and motivation" can be assessed based on past occurrences in similar situations (e.g., a driver that is reluctant to assume monitoring when he or she is reading the newspaper), on driver's verbal accounts, and/or on his or her responses to ongoing alerts. Readiness, as well as intentions and motivation, are used to estimate the quality of transfer of control to the user.

The quality of transfer of control, in an embodiment, is estimated as the cartesian product of "readiness" and "intentions and motivation." For example, if driver readiness is low (e.g., the driver is not in the seat or is in some awkward posture), but his or her motivation is high due to frustration and anxiety (as estimated based on image analysis or other driver tracking means), the product of the two elements ("readiness" and "intentions and motivation") yields transition times ($t_{transition->monitoring}$, $t_{monitoring->monitoring}$, $t_{evasive\ maneuver}$). Based on these times, the length of the NDRT that can be provided to the driver, can be predicted.

At block 134, the system determines based on the level of readiness, intentions and motivation, and/or environmental context whether the NDRT can be performed. If so, the system calculates or acquires a time allocation $t_{NDRT\_Alloc}$ for the user to perform the NDRT, taking into account the time for transition to monitoring. The system also determines time periods for transitioning and performing evasive maneuvers as discussed above.

At block 135, the system transitions to an NDRT state, during which the system automatically controls the vehicle and does not require that the user stay attentive.

At block 136, the system transitions back to a monitoring state at the expiration of an allocated time period. Alternatively, the system transitions back to the monitoring state earlier based on user input (e.g., the user cancels the NDRT request or indicates that the NDRT is complete, or in response to a change in the vehicle or the environment). Other events or user actions can be identified as an indication of completion, such as the user sending an email or text, ending a phone call, finishing eating etc.

In an embodiment, the system can actively query the user for an indication that the NDRT is complete, which can be used to determine completion alone or in combination with collected data from cameras and other sensors. For example, at a selected point during the $t_{NDRT\_Alloc}$ (e.g., some number of seconds before the end), the system begins questioning the driver regarding the completion of the task via audible request or display. Further, completion can be forced by removing the task from the queue.

NDRTs can be scheduled in various ways. For example, an overall time period can be scheduled according to a "fixed" NDRT algorithm, a "rolling" NDRT algorithm or a "rolling bounded" algorithm.

Fixed NDRT time periods are specific to a given task and provide a pre-determined time for a user to perform an NDRT. Rolling NDRT time periods may provide additional time to complete a task if an originally allocated time is insufficient. Rolling bounded NDRT time periods provide additional time but are bounded by, for example, regulatory requirement or by internal computation based on driver state, road condition, and environment state.

Figure 6:
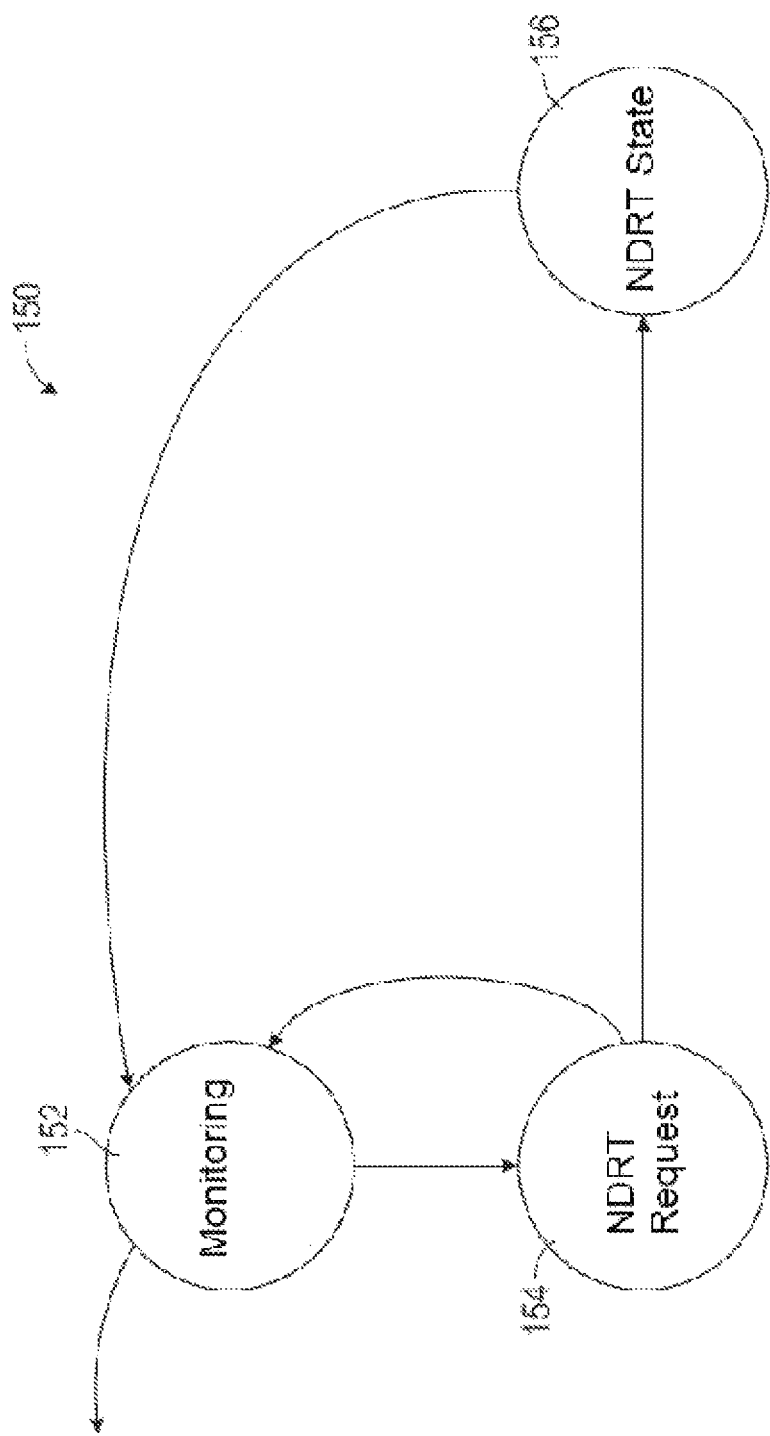
FIG. 6 illustrates a finite state machine (FSM) of a control system in accordance with an exemplary embodiment, the FSM configured to allocate pre-defined time periods.

FIG. 6 depicts an embodiment of a finite state machine (FSM) 150 used to perform a fixed NDRT allocation method. The FSM 150 includes a monitoring state 152, which can transition to a manual operation (driving loop) in response to various conditions (e.g., situations in which an evasive maneuver is called for).

In response to a request for an NDRT, the FSM 150 transitions to a NDRT request state 154. In this state, the scheduling and allocation module 82 determines the estimated total amount of non-monitoring time based on the vehicle state (e.g., speed), road and other environmental conditions, traffic conditions and driver state. "Non monitoring time "or $t_{est\ non\ monitoring}$ is the total amount of time available for the driver to be in a non-monitoring state.

$t_{est\ non\ monitoring}$ is the estimated time in which the driver or user will not be required to monitor vehicle operation, and may be based on factors such as the vehicle's sensing capabilities (e.g., range, coverage, detection abilities, etc.), road condition (e.g., traffic and other road users in vicinity), road and infrastructure type (e.g., suburban, rural, highway, urban, etc.), environmental factors (e.g., rain, dusk, sleet, etc.), and road geometry (e.g., curvy, straight, etc.). The time for non-monitoring may be subject to a pre-determined maximum (e.g., bounded by some regulatory value). In addition, the time for non-monitoring may be adjusted dynamically as conditions change.

The non-monitoring time is compared to a sum of a minimum NDRT time $t_{minNDRT}$ (which may be based on data observed from the driver and/or other drivers) and the time to transition to monitoring ($t_{transition->monitoring}$) to ensure that sufficient time can be allocated for the NDRT. This comparison can be represented as:

$$t_{est\ non\ monitoring} \geq t_{minNDRT} + t_{transition->monitoring}$$

The minimum time may be a value assigned to all tasks, or may be specific to one or more tasks.

If the estimated non-monitoring time is greater than or equal to the sum, then the FSM 150 transitions to an NDRT state 156. In the NDRT state 156, the vehicle operates automatically while allowing the user to be inattentive and perform the NDRT.

Figure 7:
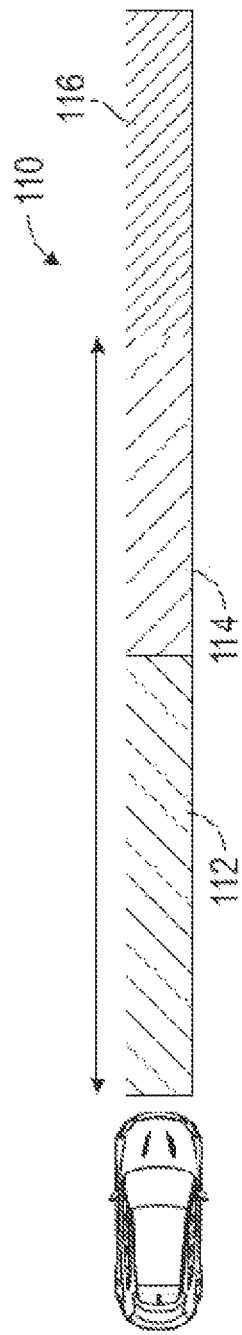
FIG. 7 depicts an example of a time period allocated by the control system of FIG. 6.

FIG. 7 illustrates an example of the time period 110 that includes a time period allocated for an NDRT. In this example, the time allocation is a fixed allotment. In this example, the scheduling and allocation system 80 maintains a queue of tasks, which may be assigned with varying levels of priority. The user wants to send an urgent SMS message and inputs an associated request (e.g., by selecting the task from a displayed queue or entering the task). This request is considered high priority and thus is executed prior to other scheduled NDRT time periods.

In this example, the estimated time for performing the NDRT (composing and sending the message) is 10 seconds, $t_{minNDRT}$ is 5 seconds and $t_{transition->monitoring}$ is 3 seconds. The estimated non-monitoring time is 9 sec, which represents an allowable amount of time based on the vehicle sensor capabilities, the state of the driver and external conditions (e.g., weather, road and traffic).

$t_{minNDRT}$ $t_{transition->monitoring}$ is 8 seconds, which is less than the non-monitoring time, thus the system can allocate time for this NDRT. The allocated time period 112 ($t_{NDRT\ alloc}$) in this example is 9 seconds−3 seconds=6 seconds.

Figure 8:
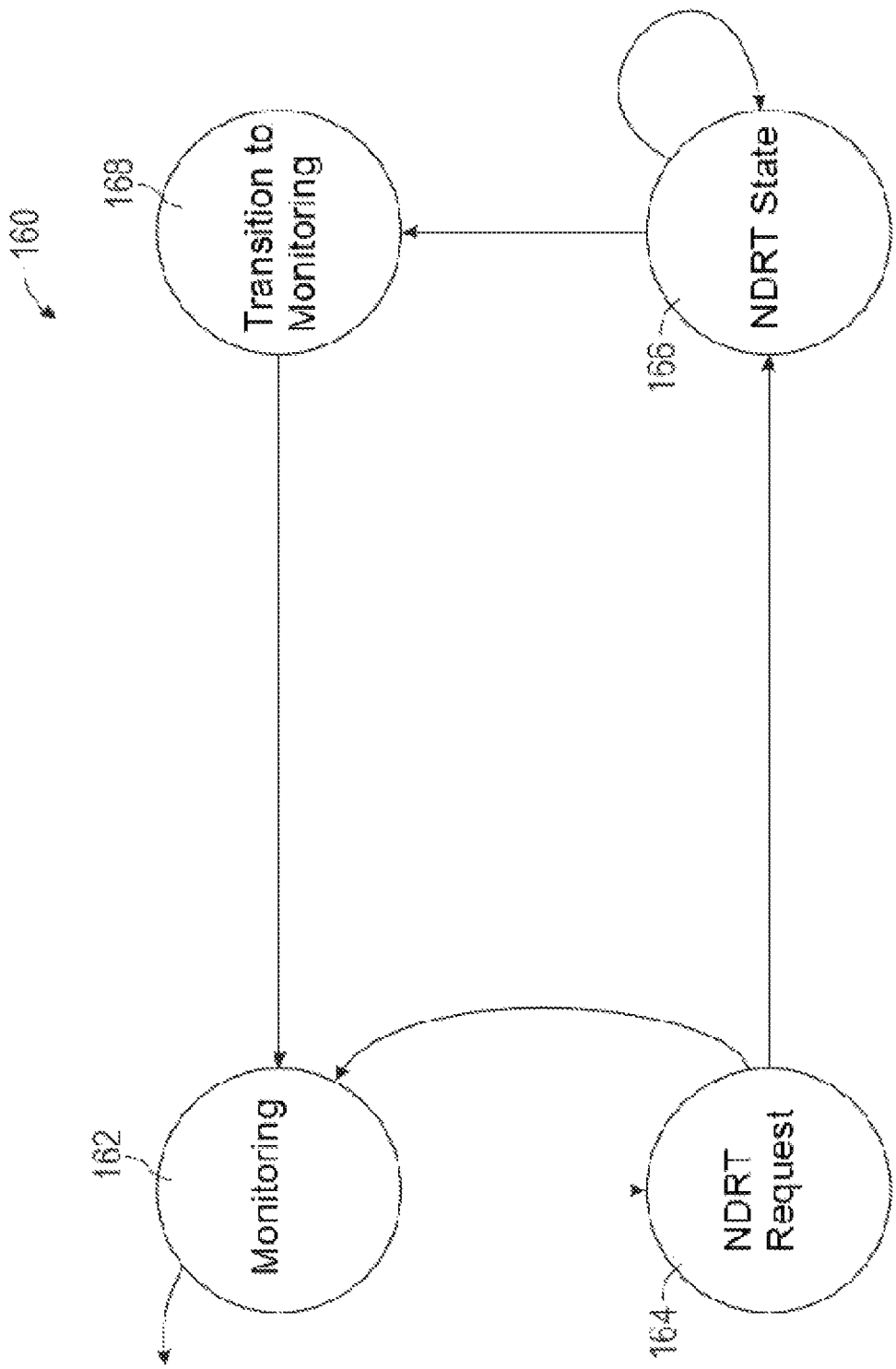
FIG. 8 illustrates an FSM of a control system in accordance with an exemplary embodiment, the FSM configured to allocate multiple time periods and/or extend a pre-defined time period.

FIG. 8 depicts an embodiment of an FSM 160 for performing a rolling NDRT allocation method. The FSM 160 includes a monitoring state 162, in which the vehicle is in the monitoring state and can be returned to the driving loop. In response to a request for an NDRT, the FSM 160 transitions to a NDRT request state 164. If $t_{est\ non\ monitoring} \geq t_{minNDRT} + t_{transition \rightarrow monitoring}$, then the FSM 160 transitions to an NDRT state 166. The FSM 160 stays in the NDRT state 166 as long as $t_{est\ non\ monitoring} \geq t_{transition \rightarrow monitoring}$. If the user indicates that the NDRT is complete, or $t_{est\ non\ monitoring} < t_{transition \rightarrow monitoring}$, the FMS 160 transitions to a "transition to monitoring" state 168, and the scheduling and allocation system 80 returns to monitoring.

In an embodiment, the FSM 160 is configured for executing a "rolling" NDRT as discussed above, and/or is configured for executing a "rolling bounded" NDRT allocation method.

In the rolling embodiment, the FSM 160 stays in the NDRT state 166 as long as $t_{est\ non\ monitoring} > t_{transition \rightarrow monitoring}$ (unless conditions or user input necessitate earlier completion). In principle, the system 80 can stay in the NDRT state indefinitely, or at least until conditions occur that necessitate a return to monitoring and/or manual control.

In rolling bounded NDRT embodiments, the total non-monitoring time is bounded to be within a selected or calculated range.

For example, NDRT time is bound by regulatory requirement, manufacturer, driver preferences or by internal computation. In an embodiment, $t_{NDRT\ alloc.}$ is bounded by a maximum time, referred to as "NDRT Total." Such a bound can be imposed or provided by a manufacturer or per the driver's preferences. The bound can be also imposed by regulatory requirements.

In the NDRT state 166, the system can allocate time for multiple tasks. If the user indicates that the NDRT is complete, $t_{est\ non\ monitoring} < t_{transition \rightarrow monitoring}$, or NDRT Total is greater than or equal to a selected threshold, the FSM 160 transitions to the transition to monitoring state 168, and the system 80 returns to the monitoring state and the driver returns to monitoring.

In an embodiment, the system 80 is configured to extend an NDRT allocation $t_{NDRT\ alloc.}$ after a short monitoring period. This allotment of a short monitoring period is referred to as "periscoping."

Figure 9:
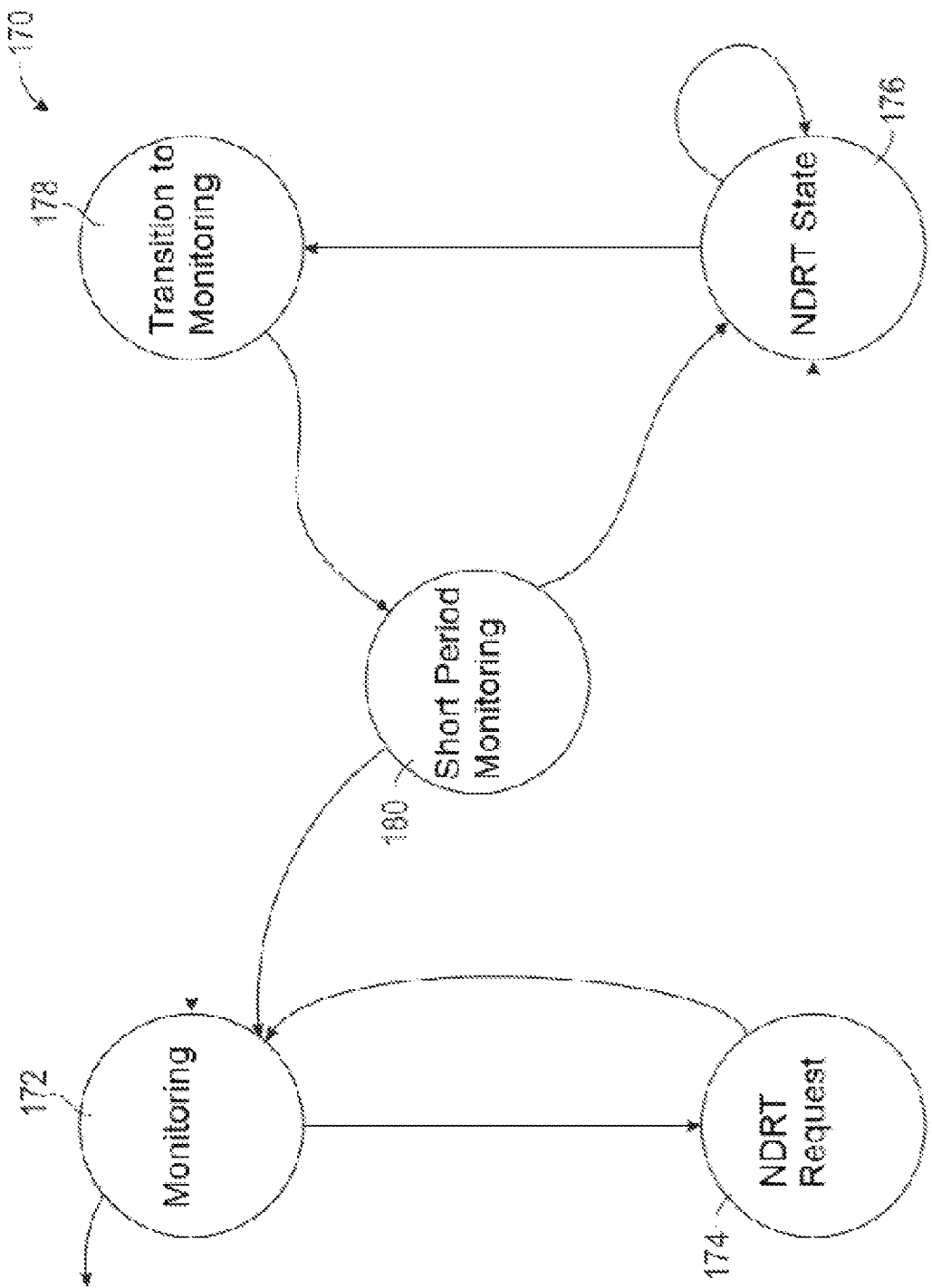
FIG. 9 illustrates an FSM of a control system in accordance with an exemplary embodiment, the FSM configured to allocate one or more time periods and a relatively short monitoring period between non-monitoring periods and/or subsequent to an allocated time period.

FIG. 9 depicts an embodiment of an FSM 170 for performing a rolling and periscoping NDRT allocation method, in which a short time allotment $t_{monitoring\ min}$ is provided for periscoping. The FSM 170 includes a monitoring state 172, in which the vehicle is in the monitoring state and can be returned to the driving loop. In response to a request for NDRT, the FSM 170 transitions to an NDRT request state 174. The system 80 estimates the total amount of non-monitoring time. If $t_{est\ non\ monitoring} \geq t_{minNDRT} + t_{transition \rightarrow monitoring}$, then the FSM 170 transitions to an NDRT state 176.

It is noted that $t_{est\ non-monitoring}$ may change over time as a function of environment and/or user conditions. When the user is occupied in the NDRT the ability to assess the user's ability to return to monitoring (and driving) is likely to reduce over time (e.g., the user is looking down at his cell phone). Thus, as the user spends more time in the NDRT state (rolling), $t_{est\ non-monitoring}$ decreases, both because the system 80 may be temporarily unable to estimate the user's ability to monitor and drive, as well as due to the fact that the likelihood of a system malfunctions increases over time. As a result, the FSM 170 can transition to short period monitoring, or "periscope." Once periscoping is complete, $t_{est\ non\ monitoring}$ is likely to increase again.

For example, when the FSM 170 enters the NDRT state 176, a timer is activated. The FSM 160 stays in the NDRT state 166 as long as $t_{est\ non\ monitoring} \geq t_{transition \rightarrow monitoring}$. If the user indicates that the NDRT is complete, or $t_{est\ non\ monitoring} < t_{transition \rightarrow monitoring}$, the FMS transitions to a transition to monitoring state 178.

If the NDRT is not complete, or another NDRT is to be performed, the FSM 170 transitions to a short period monitoring state 180, in which a short period $t_{monitoring\ min}$ is allotted for the driver to return to monitoring temporarily. When $t_{monitoring \rightarrow min}$ is over and $t_{est\ non\ monitoring} < t_{minNDRT} + t_{transition \rightarrow monitoring}$, the FSM 170 returns to the monitoring state 172. If $t_{monitoring\ min}$ is over and $t_{est\ non\ monitoring} \geq t_{minNDRT} + t_{transition \rightarrow monitoring}$, the FSM 170 transitions bask to the NDRT state 176. This may be repeated as desired or as time and conditions allow.

In an embodiment, rolling and periscoping may be bounded based on, for example, regulatory requirements. As an allocated NDRT period progresses, the accumulated NDRT time $t_{NDRT\_Total}$ (starting from the last transition to NDRT state) is restricted within a maximum time. For example, the FSM 170 stays in the NDRT state 176 if $t_{est\ non\ monitoring} \geq t_{transition \rightarrow monitoring}$ and $t_{NDRT\_Total}$ is less than a threshold (e.g., 30 seconds). Likewise, transition from the NDRT state 176 to the transition to monitoring state 178 occurs if $t_{est\ non\ monitoring} < t_{transition \rightarrow monitoring}$, the user indicates completion, or the threshold is reached (e.g., $t_{NDRT\_Total}$ is greater than or equal to 30).

In an embodiment, the system 80 is configured to schedule and allocate multiple tasks, which may be previously scheduled tasks or tasks requested during driving or operation. Scheduled tasks may be assigned priority or urgency levels so that more important or urgent tasks are assigned quickly.

Figure 10:
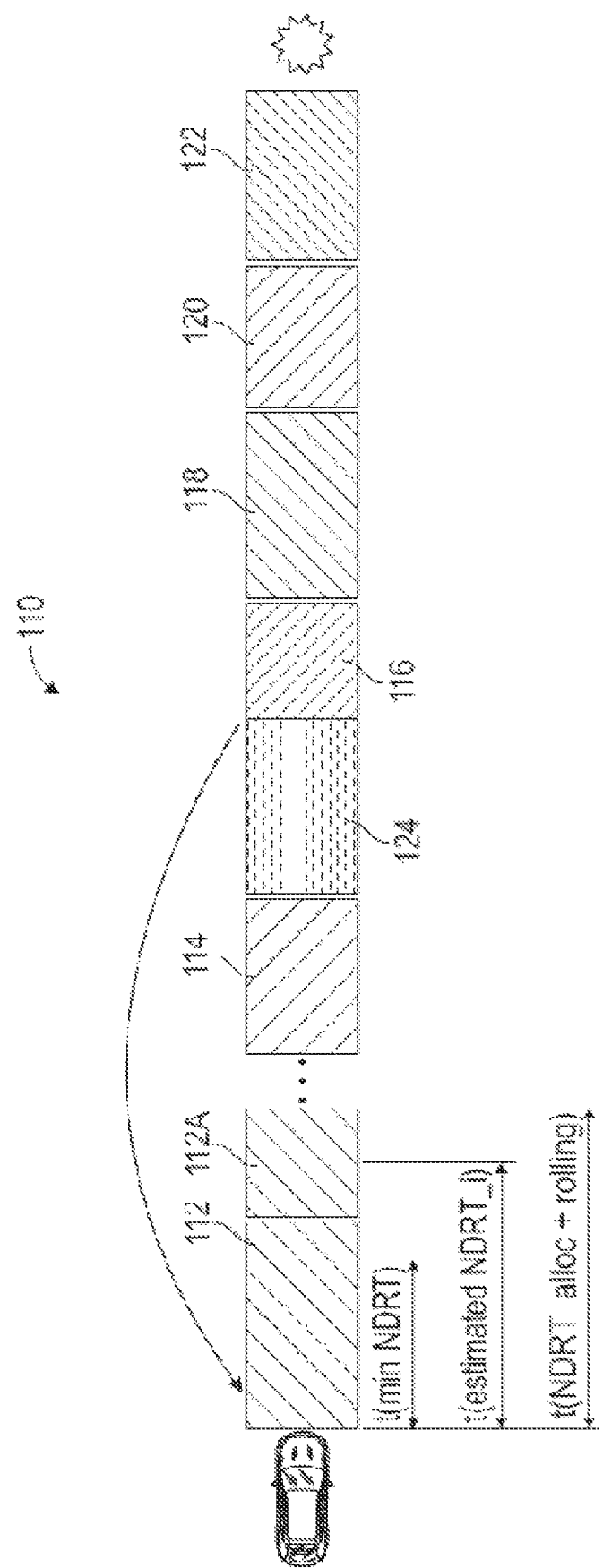
FIG. 10 depicts an example of a time period including an allocated non-monitoring period, the non-monitoring period allocated by the control system of FIG. 9.

FIG. 10 depicts an embodiment of the time period 110, which includes allocated times for both rolling and periscoping. As shown, the time period 112 includes an allocated NDRT time 112 denoted as $t_{NDRT\ alloc.}$, which can be extended from an initial value to an extended value. The allocated time period 112 includes the minimum time $t_{min\ NDRT}$, an estimated time to complete an NDRT ($t_{estimated\ NDRT}$), and an extended time that includes $t_{NDRT\_alloc.}$ and an extended time ("rolling"). The extended time is represented by time 112A. For example, the time period 110 is selected such that at the end of the allocated NDRT time 112, a transition to monitoring time 114 and a short monitoring time 116 (periscope) is provided.

Figure 11:
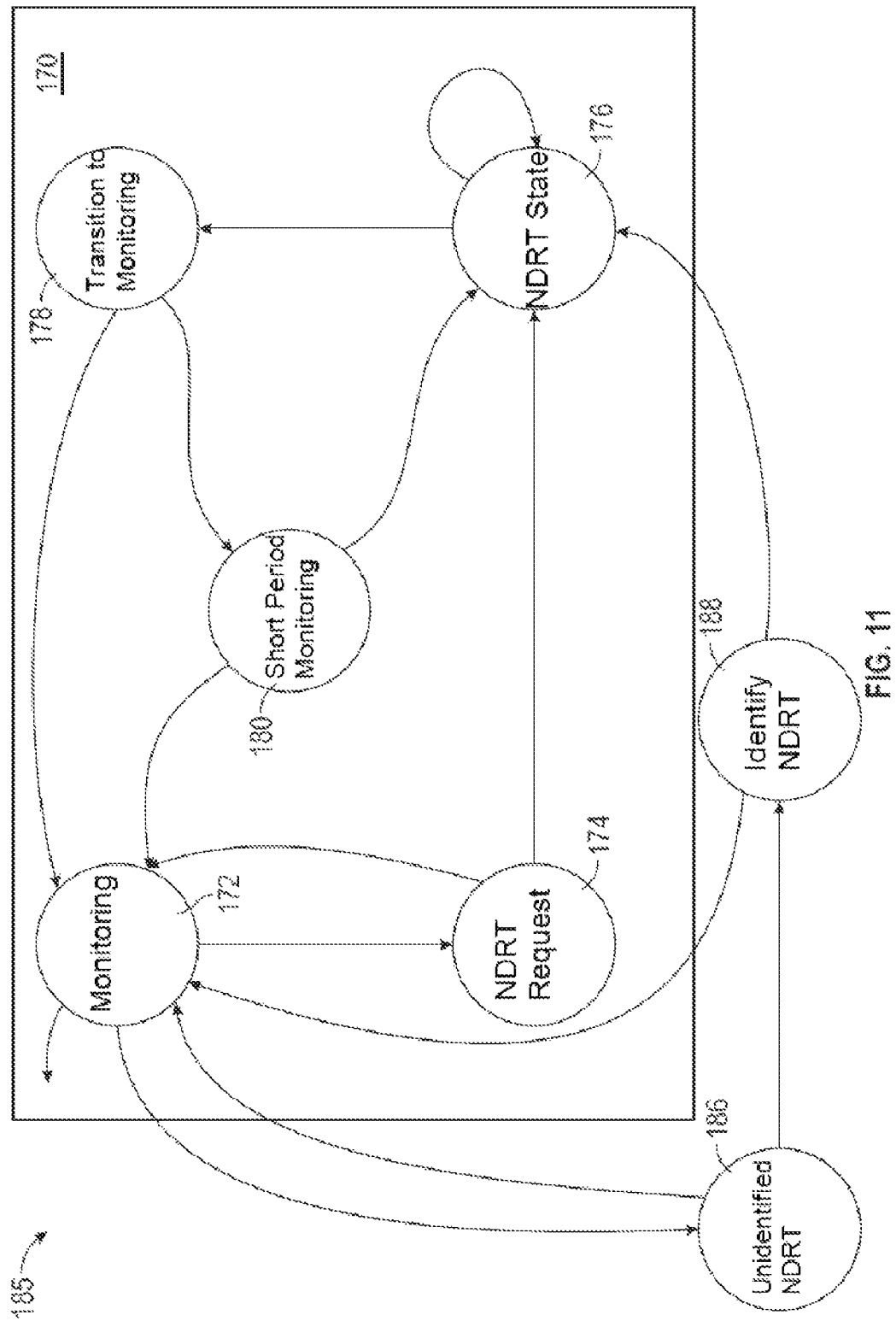
FIG. 11 illustrates an FSM of a control system in accordance with an exemplary embodiment, the FSM configured to identify the performance of a non-driving related task and determine based on conditions of the environment (e.g., vehicle, road and traffic conditions) and user state whether to allocate a time period for a non-driving related task.

FIG. 11 depicts an embodiment of an FSM 185 for performing an NDRT allocation method, which includes features related to identifying NDRTs. The FSM 185 is configured to react to a user's behavior in the event that the user attempts to perform an unauthorized NDRT or is inattentive for longer than a default time. The FSM 185 includes capability for performing both periscoping and rolling NDRT allocations, but is not so limited. For example, the FSM 185 may be configured to perform strict allocations, or a rolling allocation (without periscoping).

The FSM 185 includes the monitoring state 172, the NDRT request state 174, and the NDRT state 176. The FDM 185 also includes the transition to monitoring state 178 and the short period monitoring state 180. Transitions between these states are described above with reference to the FSM 170.

The FSM 185 is configured to receive camera data, sensor data and/or other information related to the user condition and behavior. If the user's behavior indicates that the user is attempting to perform an NDRT (without approval from the system and without an allocated NDRT time period), the FSM 185 transitions to an "unidentified NDRT" state 186. Behaviors that can trigger this transition include changes in posture, directing the user's gaze away from the road for longer than the default time (e.g., toward the infotainment interface, the passenger seat or rear seating areas, etc.), the user attempting to engage the infotainment system or other vehicle interface, and the user verbalizing an intention to perform an NDRT.

If the user's behavior indicates that the user intends to or is attempting to perform an NDRT, the FSM 185 transitions to the unidentified NDRT state 186. When at the unidentified NDRT state 186, if conditions arise such that the user should be monitoring or driving, the FSM 185 transitions immediately, or within the default time, to the monitoring state, essentially refusing the NDRT. At this point, the system 80 can indicate to the user that the NDRT is not available and/or provide an estimate as to when the system 80 can allocate time for the intended NDRT.

If conditions permit, the FSM 185 transitions to an "identify NDRT" state 188 and the system 80 attempts to identify the intended NDRT. If the NDRT is identified, the system consults a look-up table or other data structure to determine the estimated time to transition to monitoring $t_{transition\text{->}monitoring}$ If the intended NDRT is not identified, then pre configured fixed values for $t_{transition\text{->}monitoring}$ are selected.

If $t_{est\ non\ monitoring}$ is greater than or equal to $t_{transition\text{->}monitoring}$, the FSM 185 transitions to the NDRT state 176. If $t_{est\ non\ monitoring}$ is less than $t_{transmission\text{->}monitoring}$, the system refuses the identified NDRT, transitions to the monitoring state 172, and indicates the refusal to the user. Alternatively, if conditions permit, the system can attempt to increase $t_{est\ non\ monitoring}$ (e.g., by lowering speed, shifting to the right lane, etc.).

Figure 12:
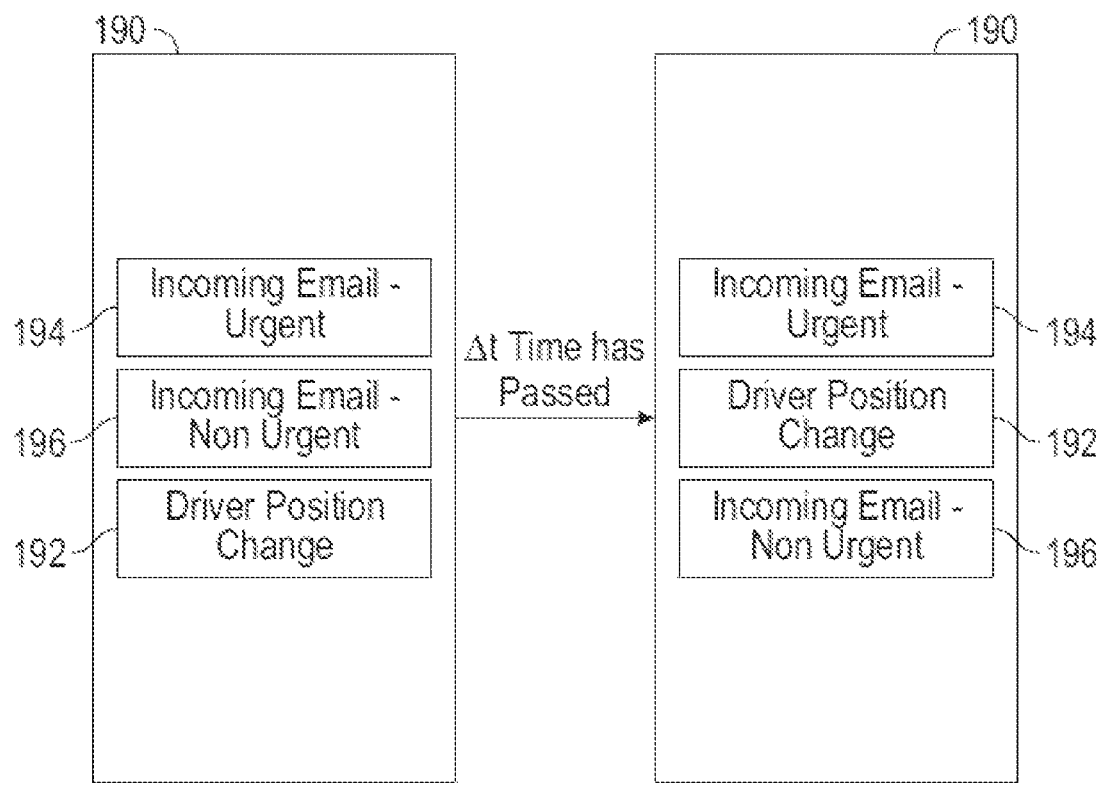
FIG. 12 illustrates an embodiment of a dynamic priority queue for scheduling multiple time periods associated with multiple tasks unrelated to driving or automated device operation, in accordance with an exemplary embodiment.

FIG. 12 depicts an example of a priority queue 190 that may be used by the system 80 to coordinate the allocation of time periods for various NDRTs (or NDRT types). Each NDRT is entered into the priority queue 190 with an initial priority. When an entry is selected, associated time periods may be extracted from a stored record in a database or elsewhere.

The queue 190 is populated by individual NDRT entries (NDRTi) according to an order of execution, or according to priority. When an NDRT is complete, its record is removed and subsequent NDRT entries are moved up in the queue.

For example, the queue 190 includes a low priority entry for an NDRT "driver position change" 192. Incoming emails prompt corresponding entries to be inserted into the queue 190 according to priority. In this example, an "incoming email—urgent" entry 194 is inserted at the top of the queue with a high priority. An "incoming email—non urgent" entry 196 is inserted with an intermediate priority.

NDRTs may change their priority over time—hence "dynamic". The priority of individual records may change, for example, due to changes in vehicle, user or environmental conditions. After a period of time has passed in the example of FIG. 12, driver behavior may indicate that a position change is more urgent. As such, the "driver position change" entry 192 is assigned a higher priority and moved up in the queue 190.

Figure 13:
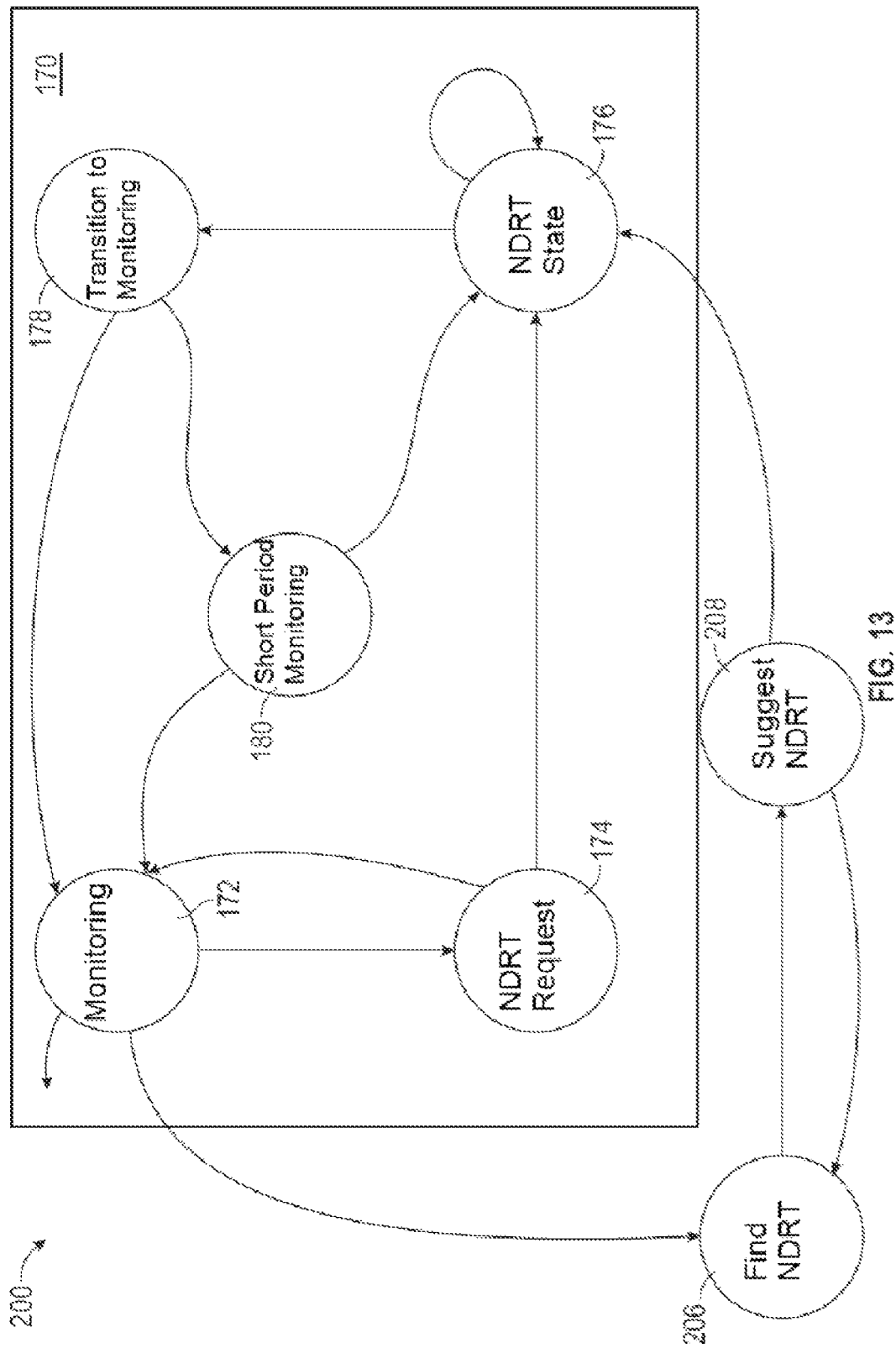
FIG. 13 illustrates an FSM of a control system in accordance with an exemplary embodiment, the FSM configured to allocate and prioritize time periods for various tasks.

FIG. 13 depicts an FSM 200 for performing a scheduling and allocation method that schedules a plurality of NDRTs. In this embodiment the system 80 utilizes a priority queue (e.g., the queue 190) to schedule NDRT time periods, optionally with periscoping. The FSM 200 utilizes explicit or implicit indications of completion to determine when an NDRT is completed. If such indications are not available the system 80 continues with the NDRT allocation for as long as possible (as long as $t_{est\ non\ monitoring}$ allows it, as $t_{est\ non\ monitoring}$ can be continuously or periodically updated to ensure that conditions allow for allocating NDRT time periods).

An "in progress NDRT" parameter, which determines whether the user is in the middle of an NDRT, is initialized to "False." The location of an entry in the queue is denoted as "x", and a current NDRT is denoted "NDRTx."

An NDRTx has two defining values a minimum required time $t_{minNDRT}(X)$ and additional time $t_{transition\text{->}monitoring}(x)$ to return to the monitoring state from a specific NDRT state. NDRT entries in the queue are examined from highest priority downwards if they comply with the following:

$$t_{est\ non\ monitoring} \geq t_{minNDRT}(X) t_{transition\text{->}monitoring}(X),$$

If so, the following time is allocated for the NDRT:

$$t_{NDRT\ alloc.} = t_{est\ non\ monitoring} - t_{transition\text{->}monitoring}(X).$$

This might be more than required for the specific NDRT. In such a case, the driver will indicate "done" and will return to short period monitoring before being able to switch to another NDRT.

Referring still to FIG. 13, the FSM 200 includes the monitoring state 172 and the short period monitoring state 180. When the FSM 200 is in the monitoring state 172, the vehicle is tracked by the system 80 to identify conditions that would be conducive to allocating a non-monitoring period. If so, the FSM 200 transitions to a "find NDRT in queue state 206, in which the NDRTx at the top of the queue is checked by comparing a reference time $t_{est\ non\ monitoring}$ (estimated based on conditions) to the sum of the minimum NDRT time and times to transition to monitoring. If $t_{est\ non\ monitoring}$ is less than the sum, the system 80 checks the next NDRT in the queue (NDRT(x+1). If $t_{est\ non\ monitoring}$ is greater than or equal to the sum, the FSM 200 transitions to state 208 and suggests the NDRTx to the user. If the user declines, the FSM 200 transitions back to state 206. If the user accepts, the FSM 200 transitions to an NDRT state 176, during which a time period is allocated and the vehicle temporarily allows the user to perform the NDRTx.

Once the system receives an explicit indication of completion from the user or an implicit indication, the NDRT is completed (in progress NDRT=False) and the completed NDRTx is removed from the queue.

If $t_{est\ non\ monitoring} < t_{transition\text{->}monitoring}$, transition to monitoring in state 178 is performed. If the NDRTx is not completed, the FMS 200 transitions to the short monitoring period state 180 and initializes a monitoring timer. If the NDRT is currently being performed and the monitoring timer reaches a minimum value $t_{monitoring\ min}$, the system returns to the NDRT state 176. In this way, a short monitoring period is inserted into the allocated NDRT time for a specific NDRT.

If $t_{est\ non\ monitoring} < t_{transition\text{->}monitoring}$, the FSM 200 transitions to monitoring in state 178. If the NDRTx is complete (in progress NDRT=False), the transition is to the monitoring state 172. NDRTx is then removed from the queue and x is initialized to zero. If additional time for performing NDRTs is available, the FSM 200 transitions back to state 206 and again checks the NDRT according to the queue.

In an embodiment, vehicle operation and/or route may be controlled in order to allow time for, or otherwise facilitate longer NDRTs. If multiple routes are possible, a given route may be selected based on criteria related to NDRT performance. For example, evaluating routes is based on determining the shortest route, subject to sufficient estimated NDRT time throughout the route, to accommodate the current NDRTs in the queue (e.g., those requested by the driver). This is a setting that the driver can manipulate in a preferences page of the system. The setting can be predefined and/or changed dynamically during driving. Available routes may be represented as a set $S=\{s_1, s_2, \ldots, s_k\}$ of possible routes. Each route $s_i$ has two relevant parameters: $t_i$ and NDRT time$_i$. The optimization problem for choosing the best possible route is to find the minimum $t_i$ under the constraint of having NDRT time$_i$ be at least some estimated value based on the driver's requested NDRTs.

The system 80 may also adjust vehicle dynamics in order to accommodate NDRTs. For example, the system 80 identifies a need for an immediate NDRT (scheduled prior to or during drive, explicit requests, positive NDRT acts, urgent email, etc.). The system 80 then determines whether $t_{est\ non\ monitoring}$ is sufficient to allow a user to perform the NDRT. If not, the system 80 can adjust driving style to increase $t_{est\ non\ monitoring}$. Non limiting examples of driving adjustments include changing to left-most lane and avoiding additional change-of-lane, reducing speed, adjusting speed to follow another vehicle, and making changes to a route.

The following table illustrates examples of NDRT times. Each NDRT time is associated with a specific task or associated with a type of task. As shown NDRT times can be categorized as short and long. Short times (type I) are typically under one minute and involve relatively simple tasks. Long times (type II) are typically of longer duration (minutes to hours) and involve high concentration. This table may be configured as a look-up table and stored, for example, in the database 96.

| Tasks (uses cases) Type I: short Type II: long and require higher level of attentiveness | Min./Max Estimated Time to complete the task | Time to transition to monitoring | Estimated time for sufficient monitoring "Periscope" | Time to transition to driving (include stabilization | Transition-to-maneuvering |
|---|---|---|---|---|---|
| SMS Read & dictate/type | 5-10 sec. | 3 sec. (3-8 sec.) | 5-10 sec. | 2 sec. (2LB, 3UP) | 2 sec. (1LB, 4UP) |
| E-mail Read & dictate/type | 8-30 sec. | 5 sec. (3-8 sec.) | 5-10 sec. | 3 sec. (2LB, 5UP) | 3 sec. (1LB, 4UP) |
| SmartPhone short activity | 5-10 sec. | 3 sec. (3-8 sec.) | 5-10 sec. | 2 sec. (2LB, 3UP) | 2 sec. (1LB, 4UP) |
| Getting better situated in the driver seat, removing jacket, etc. (comfort) | 5-10 sec. | 2 sec. (1-5 sec.) | 3-6 sec. | 2 sec. (2LB, 3UP) | 2 sec. (1LB, 4UP) |
| Type II: Video-conferencing | 15-120 minutes* | 10 sec. (7 LB, 8 UP) | 10-20 sec. | 2 sec. (3LB, 5UP) | 3 sec. (1LB, 5UP) |

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for control of an automated device, comprising:
   a control system configured to operate a device during a monitoring mode, the monitoring mode corresponding to a first state in which the control system automatically controls device operation and a user is required to monitor the device operation during automated control;
   a scheduling module configured to maintain a queue of one or more tasks, each task of the one or more tasks being unrelated to the device operation, the queue relating each task to a minimum amount of time for performing each task and transitioning from a temporary state to the first state, the scheduling module configured to perform, during the monitoring mode:
   receiving a request for the user to temporarily stop monitoring in order to perform a task unrelated to the device operation;
   determining conditions including a state of the user and a state of the device, and determining whether the conditions permit the user to temporarily stop monitoring the device;
   selecting a task from the queue based on the conditions permitting allocation of a time period including the minimum amount of time, and presenting the selected task to the user; and
   based on the user accepting the selected task, allocating the time period during which the device is in the temporary state, wherein the control system maintains automated control and permits the user to stop monitoring during the temporary state, the allocated time period including a non-monitoring period, the non-monitoring period including a period for performing the selected task and a transition period associated with a transition from the first state to the temporary state;
   wherein the control system is configured to put the device into the temporary state at initiation of the allocated time period during which the user stops monitoring and automated control is maintained.

2. The system of claim 1, wherein the scheduling module is configured to monitor the user during the allocated time period, and return the device to the first state based on at least one of: user input, user behavior indicating that the user has completed the selected task, and a condition of an environment around the device.

3. The system of claim 1, wherein the device is a vehicle and the task is a non-driving related task (NDRT).

4. The system of claim 1, wherein the request is generated based on at least one of: a user request during device operation, a user condition, a previously scheduled time period and a system suggestion based on a user history.

5. The system of claim 1, wherein the allocated time period includes an evasive maneuver period having a duration based on an estimated time for the user to cease performing the selected task, take manual control and perform an evasive maneuver.

6. The system of claim 1, wherein the scheduling module is configured to perform at least one of:
removing the selected task from the queue and returning to the first state based on explicitly or implicitly determining that the user has completed the selected task; and
based on the period for performing the selected task expiring and determining that the user has not completed the selected task, allocating a short monitoring period and putting the device into the monitoring mode during the short monitoring period, and subsequently returning the device to the temporary state based on the conditions permitting the user to stop monitoring.

7. The system of claim 1, wherein the scheduling module is configured to maintain a plurality of tasks in the queue, each of the plurality of tasks having a respective allocated time period scheduled to begin at a respective time.

8. The system of claim 7, wherein the scheduling module is configured to provide a plurality of allocated time periods in an order based on an importance or urgency of each allocated time period, the urgency indicated by a dynamic priority associated with each allocated time period in the queue, the dynamic priority determined during operation based on monitored conditions.

9. The system of claim 7, wherein the scheduling module is configured to perform at least one of:
suggesting a task from the queue based on the conditions indicating that the user would benefit by performing the suggested task; and
predicting a task based on a history of user behavior, and adding the predicted task to the queue.

10. A method of controlling an automated device, comprising:
operating the device during a monitoring mode, the monitoring mode corresponding to a first state in which a control system automatically controls device operation and a user is required to monitor the device operation during automated control, wherein a scheduling module is configured to maintain a queue of one or more tasks, each task of the one or more tasks being unrelated to the device operation, the queue relating each task to a minimum amount of time for performing each task and transitioning from a temporary state to the first state;
during the operating mode, receiving a request for the user to temporarily stop monitoring in order to perform a task unrelated to the device operation;
determining conditions including a state of the user and a state of the device, and determining whether the conditions permit the user to temporarily stop monitoring the device;
selecting a task from the queue based on the conditions permitting allocation of a time period including the minimum amount of time, and presenting the selected task to the user;
based on the user accepting the selected task, allocating the time period during which the device is in a temporary state, wherein the control system maintains automated control and permits the user to stop monitoring during the temporary state, the allocated time period including a non-monitoring period, the non-monitoring period including a period for performing the selected task and a transition period associated with a transition from the first state to the temporary state; and
putting the device into a temporary state at initiation of the allocated time period.

11. The method of claim 10, further comprising monitoring the user during the allocated time period, and returning the device to the first state based on at least one of: user input, user behavior indicating that the user has completed the selected task, and a condition of an environment around the device.

12. The method of claim 10, wherein the device is a vehicle and the task is a non-driving related task (NDRT).

13. The method of claim 10, wherein the allocated time period includes an evasive maneuver period having a duration based on an estimated time for the user to cease performing the task, take manual control and perform an evasive maneuver.

14. The method of claim 10, further comprising at least one of:
removing the selected task from the queue and returning to the first state based on explicitly or implicitly determining that the user has completed the selected task; and
based on the period for performing the selected task expiring and determining that the user has not completed the selected task, allocating a short monitoring period and putting the device into the monitoring mode during the short monitoring period, and subsequently returning the device to the temporary state based on the conditions permitting the user to stop monitoring.

15. The method of claim 10, further comprising maintaining a plurality of tasks in the queue, each of the plurality of tasks having a respective allocated time period scheduled to begin at a respective time.

16. The method of claim 10, further comprising at least one of:
suggesting a task from the queue based on the conditions indicating that the user would benefit by performing the suggested task; and
predicting a task based on a history of user behavior, and adding the predicted task to the queue.

17. A vehicle system comprising:
a memory having computer readable instructions; and
a processing device for executing the computer readable instructions, the computer readable instructions controlling the processing device to perform:
operating a vehicle during a monitoring mode, the monitoring mode corresponding to a first state in which a control system automatically controls vehicle operation and a user is required to monitor the vehicle operation during automated control, wherein a scheduling module is configured to maintain a queue of one or more tasks, each task of the one or more tasks being unrelated to the vehicle operation, the queue relating each task to a minimum amount of time for performing each task and transitioning from a temporary state to the first state;

during the monitoring mode, receiving a request for the user to temporarily stop monitoring in order to perform a task unrelated to the vehicle operation;

determining conditions including a state of the user and a state of the vehicle, and determining whether the conditions permit the user to temporarily stop monitoring the vehicle;

selecting a task from the queue based on the conditions permitting allocation of a time period including the minimum amount of time, and presenting the selected task to the user;

based on the user accepting the selected task, allocating the time period during which the vehicle is in a temporary state, wherein the control system maintains automated control and permits the user to stop monitoring during the temporary state, the allocated time period including a non-monitoring period, the non-monitoring period including a period for performing the selected task and a transition period associated with a transition from the first state to the temporary state; and putting the vehicle into the temporary state at initiation of the allocated time period.

18. The vehicle system of claim 17, wherein the allocated time period includes an evasive maneuver period having a duration based on an estimated time for the user to cease performing the task, take manual control and perform an evasive maneuver.

19. The vehicle system of claim 17, wherein the processing device is configured to perform at least one of:

removing the selected task from the queue and returning to the first state based on explicitly or implicitly determining that the user has completed the selected task; and based on the period for performing the selected task expiring and determining that the user has not completed the selected task, allocating a short monitoring period and putting the device into the monitoring mode during the short monitoring period, and subsequently returning the device to the temporary state based on the conditions permitting the user to stop monitoring.

20. The vehicle system of claim 17, wherein the processing device is configured to maintain a plurality of tasks in the queue, each of the plurality of tasks having a respective allocated time period scheduled to begin at a respective time, and the processing device is configured to perform at least one of:

suggesting a task from the queue based on the conditions indicating that the user would benefit by performing the suggested task; and predicting a task based on a history of user behavior, and adding the predicted task to the queue.

* * * * *